Figure 1:
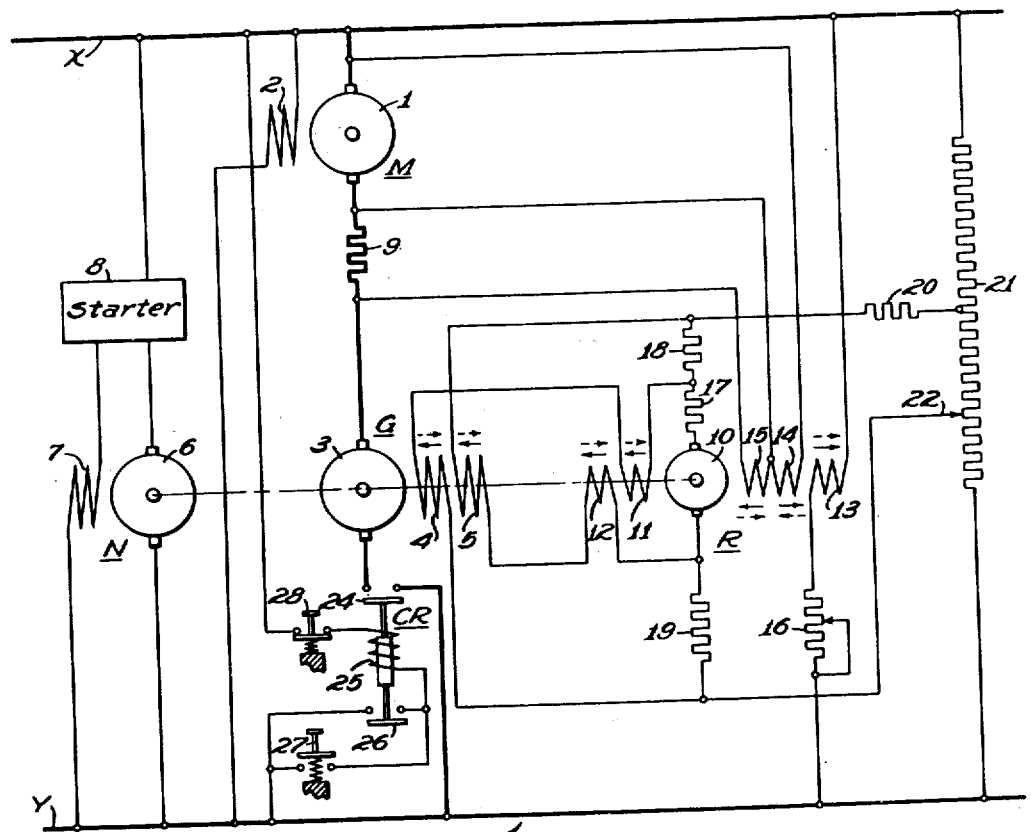

March 22, 1949.  W. R. HARRIS  2,465,226

DIRECT-CURRENT MOTOR CONTROL SYSTEM

Filed Nov. 20, 1947

WITNESSES:
Robert C. Baird
Nw. L. Groome

INVENTOR
Walter R. Harris.
BY
Paul E. Friedemann
ATTORNEY

Patented Mar. 22, 1949

2,465,226

UNITED STATES PATENT OFFICE 2,465,226

DIRECT-CURRENT MOTOR CONTROL SYSTEM

Walter R. Harris, Pittsburgh, Pa., assignor to Westinghouse Electric Corporation, East Pittsburgh, Pa., a corporation of Pennsylvania Application November 20, 1947, Serial No. 787,115

7 Claims. (Cl. 318—343)

My invention relates to electric drives whose speed is adjustable over a wide range and whose primary power is direct current.

Such drives are usually equipped with a direct-current drive motor energized by adjustable voltage from a direct-current generator which is driven by an auxiliary direct-current motor energized from the direct-current power line to operate at constant speed. Examples of such drives are winders and supercalenders in the paper industry which require speed ranges from 15:1 to 80:1.

It is an object of my invention to provide an adjustable speed drive, primarily powered by direct curent, which permits using a smaller motor generator set than heretofore required for comparable driving conditions.

Another object of the invention is to design such a drive so as to secure good speed regulation at all available operating speeds.

In order to achieve these objects, and in accordance with my invention, I connect the drive motor to be controlled to the direct-current power line in series with the armature of an adjustable-voltage generator and control the generator field by reversible excitation so that the generator voltage subtracts from the line voltage for running the motor at low speeds and adds to the line voltage for high motor speeds. According to another feature of the invention, I control the generator field excitation by means of a regulating generator whose control field windings are connected with the armature circuit of the drive motor, the field circuit of the generator, and with the direct-current power line in the manner apparent from the following description in conjunction with the embodiment exemplified by the drawing.

Figure 3:
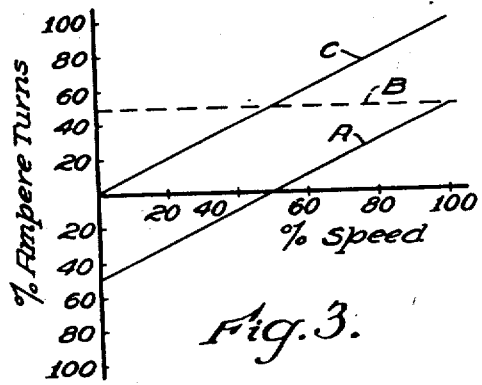
Figure 2:
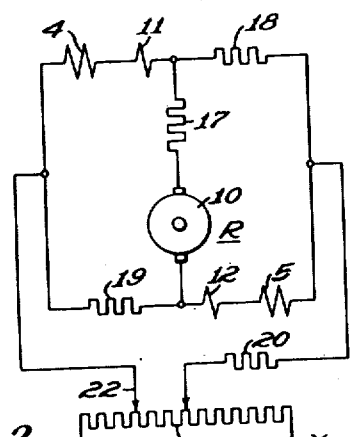

In the drawing, Fig. 1 shows a circuit diagram of an adjustable speed drive according to the invention; Fig. 2 is explanatory and shows separately one of the circuits of Fig. 1; and Fig. 3 is a coordinate diagram of explanatory nature also referring to the system according to Fig. 1.

In Fig. 1, the drive motor to be controlled is denoted as a whole by M, its armature by 1 and the appertaining field winding by 2. The field winding 2 receives normally constant excitation from the mains or busses X and Y of a direct-current power line. The armature 1 is connected between X and Y in series with the armature 3 of a main generator G with two cumulatively acting field windings 4 and 5. The generator armature 3 is mechanically connected with the armature 6 of an auxiliary motor N whose field winding is denoted by 7. The motor N is energized from busses X and Y through a suitable starter 8 to operate at substantially constant speed. Consequently, the voltage generated in armature 3 of generator G depends on the resultant excitation of field windings 4 and 5. A fixed resistor 9 is series connected in the armature circuit of motor M and generator G so that the voltage drop across resistor 9 is a measure of the current flowing in the armature circuit and hence proportional to the IR drop in that circuit.

The control system includes a regulating generator R whose armature 10 is acted upon by five field windings denoted by 11, 12, 13, 14 and 15, respectively. Armature 10 is driven at constant speed, for instance and as shown, by the motor N. Field winding 13 receives normally constant excitation from busses X and Y through rheostat 16, whose setting remains normally unchanged during the operation of the system. Field winding 14 is connected across armature 1 of driving motor M and hence is excited in proportion to the terminal voltage of motor M. Field winding 15 is connected across resistor 9 to receive excitation in proportion to the IR drop of the armature circuit. Field windings 11 and 12 are connected in a bridge network which includes the above-mentioned field windings 4, 5, 11, 12 and is also equipped with resistors of normally fixed magnitude denoted by 17, 18 and 19. The bridge network is separately shown in Fig. 2. It will be recognized that the regulator armature 10 is connected in series with the resistor 17 across one of the two bridge diagonal circuits. The other diagonal circuit includes a series resistor 20 and is connected across a tapped-off portion of a rheostat 21 which is energized across the busses X and Y. One tap point of rheostat 21 is located at the electric center of the rheostat while the other is represented by a slider 22 which can be moved to either side of the rheostat center point so that the energizing voltage applied from the rheostat to the bridge circuit can be set to any value between two respective limit values of opposing polarities.

The common armature circuit of generator G and motor M is controlled by the contact 24 of a contactor CR whose control coil 25 actuates also a self-holding contact 26. The coil circuit of contactor CR is energized from busses X and Y and includes a normally open start contact 27 and a normally closed stop contact 28.

For operating the drive motor M, the auxiliary motor N is first started. After it has reached the proper speed, the motor M can be started by depressing the contact 27. This energizes the coil 25 which then closes the armature circuit of motor M. The relay CR holds itself sealed in at contact 26 until the contact 28 is actuated to stop the drive. During the operation of motor M, its speed is controlled by the selected setting of the rheostat slider 22 and can be changed from zero to the rated maximum value. Accurate maintenance of the selected speed is secured by the regulating generator R in the manner described in the following.

The generator G is rated to either buck the line voltage down to zero or to boost the line voltage, for instance up to twice its amount. For example, with a direct-current bus voltage of 125 volts, the voltage of generator G is preferably controlled to be adjustable between plus and minus 125 volts. In this case, the motor M would be a 250 volt machine. The desired speed range of motor M would be obtained by letting the generator G buck the bus voltage down for the low speeds while boosting the line voltage up to the maximum of 250 bolts for high speeds. That is, the generator G operates in this example to vary the voltage across the motor terminals from zero to 250 volts.

In order to secure this performance of generator G, the field windings 4 and 5 are controlled by excitation whose magnitude depends on two conditions, namely on the selected adjustment of the speed adjusting rheostat 21, i. e., on the control voltage supplied from this rheostat to the bridge network shown separately in Fig. 2, and also on the regulating voltage generated in the armature 10 of generator R and applied to the other diagonal circuit of the bridge network.

The regulating voltage generated in the armature 10 of generator R depends upon the field excitation of the regulator. This field excitation is the resultant of three differently functioning components. The first component field of the regulating generator R (pilot field) is provided by the joined operation of the field windings 14 and 15. These two field windings function in mutually opposing sense. That is, the field winding 14 provides an amount of excitation corresponding to the terminal voltage of the driving motor M while the field winding 15 deducts from this amount a quantity corresponding to the IR drop in the armature circuit of drive motor M. Consequently, the pilot field means jointly represented by the windings 14 and 15 provide a component excitation proportional to the motor speed.

The second component field acting in the regulating generator R is due to the joint action of field windings 13, 11 and 12 (pattern field means). The field winding 13 provides a constant amount of pattern excitation. Field windings 11 and 12 act cumulatively with respect to each other and provide another component pattern field excitation depending upon the voltage applied to the bridge network (Fig. 2) from the tapped off portion of the rheostat 21. The amount of pattern field excitation provided by the field windings 11 and 12 is represented in Fig. 3 by the line A. Referring to the above-mentioned numerical examples, the component pattern excitation represented by line A is zero when the motor M runs at 50% rated speed, and changes from minus 50% to plus 50% ampere turns when the motor speed changes from zero to 100% rated value. The component pattern field of constant magnitude provided by the field winding 13 is represented in Fig. 3 by the line B. The resultant pattern field, representing the algebraic sum of the values represented by line A and B, is shown at C. It will be recognized that the pattern field, due to the effect of the rheostat-adjusted voltage on field windings 11 and 12, varies from zero ampere turns to 100% ampere turns when the motor speed varies from zero to 100%, respectively. This resultant pattern field (line C in Fig. 3) acts in opposition to the above-mentioned resultant pilot field. Pattern field and pilot field balance each other when the speed of motor M has the correct value. If the motor speed exceeds the correct value, the differential effect of pilot field and pattern field assumes a finite value of the same polarity as the pilot field and causes the armature 10 of the regulating generator to impose a corrective voltage on the bridge network and hence on the appertaining main field windings 4 and 5. The corrective excitation of the main generator is of the direction and magnitude required to reduce the speed of motor M to the correct value. Similarly, when the speed of motor M is below the accurate value, the differential effect of pilot field and pattern field is in the direction of the pattern field and causes the generator G to change its voltage toward the value required to increase the speed of motor M to the accurate value.

The third component field excitation effective in the regulating generator R is also provided by the above-mentioned field windings 11 and 12. It will be noted that these windings are connected in the armature circuit of the regulating generator. Hence, in addition to their pattern field function, they also provide self-excitation for generator R. The regulating generator may be rated to operate along the unsaturated and substantially linear portion of its magnetic characteristic so that the above-mentioned component field effects are superimposed on one another. The bridge network represented in Fig. 2 is preferably rated so that the resistances of its four bridge branches are equal. Under these conditions, the current generated in armature 10 and effective to energize windings 11 and 12 for self-excitation of generator R may be considered to be independent of the current which flows through the same field windings 11 and 12 but originates from the tapped off portion of the rheostat 21 in order to provide an adjustable component of pattern field excitation. Hence the field windings 11 and 12 operate in the same manner as if two sets of separately excited windings, one for self-excitation and one for component pattern excitation, were employed.

It will be noted that the pattern field current which flows through the bridge network and is proportional to the chosen adjustment of the rheostat 21, traverses also the field windings 4 and 5 of the main generator G. These field windings are rated relative to the just-mentioned current so that the field excitation of the main generator is adjusted to the approximately correct value. Consequently, the performance of the regulating generator R is limited to providing only the regulating or corrective effect needed to maintain the drive motor accurately at the desired speed value. The above-mentioned self-excitation may be adjusted, by rating the resistor 17 accordingly, to provide almost all of the field excitation needed in the regulating generator R to maintain the required corrective output voltage across armature 10. The above-mentioned pilot field and pattern field means are then only called upon to provide the slight controlling effect required to change the regulator output voltage.

By virtue of the above-mentioned features, the control system is distinguished by a regulating performance of high accuracy and sensitivity and offers the advantage that under otherwise similar circumstances the motor generator set for controlling the speed of the drive motor can be given a smaller rating than heretofore customary. For instance, with reference to the above-mentioned numerical examples, a 75 kw. generator suffices in a system according to the invention, for a drive which in a conventional system of comparable type would require a generator capacity of 150 kw.

It will be understood that all numerical examples mentioned in the foregoing are given merely for the purpose of explanation and may be changed in accordance with the requirements or desiderata of each particular application. It will also be obvious to those skilled in the art that while I have shown the several components of regulator field excitation to be provided by respective field windings, several of these windings may be combined so that the total number of field windings in the regulating generator is used, provided the appertaining field circuits are designed accordingly. Such and other modifications and alterations do not obviate achieving the objects and advantages of my invention nor depart from the essential features of the invention set forth in the claims annexed hereto.

I claim as my invention:

1. An adjustable-speed drive, comprising a direct-current drive motor, power supply busses for direct current, a direct-current main generator having an armature series connected with said drive motor across said busses and having main field means, a regulating generator having an armature for providing a regulating voltage and having mutually differential pilot field means and pattern field means respectively for controlling said regulating voltage, adjustable potentiometric circuit means connected to said busses for providing a reversible control voltage selectively adjustable between respective limit values of opposing polarities, said main field means being connected to said potentiometric circuit means to receive reversible main excitation in accordance with said control voltages and being connected to said armature of said regulating generator to receive corrective excitation in accordance with said regulating voltage, said pilot field means being connected with said motor for providing said regulating generator with pilot field excitation dependent upon the motor speed, and said pattern field means being connected with said busses and controlled by said potentiometric circuit means to provide pattern field excitation varying between given values of the same polarity as said excitation of said main field means varies between said respective limit values of different polarities.

2. An adjustable-speed drive, comprising a direct-current drive motor, power supply busses for direct-current, a direct-current main generator having an armature series connected with said drive motor across said busses and having main field means, a regulating generator having an armature for providing a regulating voltage and having mutually differential pilot field means and pattern field means respectively for controlling said regulating voltage, adjustable potentiometric circuit means connected to said busses for providing a reversible control voltage selectively adjustable between respective limit values of opposing polarities, said main field means being connected to said potentiometric circuit means to receive reversible main excitation in accordance with said control voltages and being connected to said armature of said regulating generator to receive corrective excitation in accordance with said regulating voltage, said pilot field means being connected with said motor for providing said regulating generator with pilot field excitation dependent upon the motor speed, said pattern field means having a field winding connected to said busses so as to receive a normally constant component of pattern excitation and having another field winding connected to said potentiometric circuit means to receive a reversible component of pattern excitation in accordance with said main excitation so as to provide resultant pattern excitation which varies between given values of the same polarity as said main excitation is varied between respective values of opposing polarities.

3. An adjustable-speed drive, comprising a direct-current drive motor, power busses for supplying direct current, a direct-current generator having an armature series connected with said motor between said busses and having field means, a regulating generator having an armature for providing a regulating voltage and having pilot field means and pattern field means for differentially controlling said regulating voltage, an auxiliary direct-current motor attached to said busses and mechanically connected to said respective armatures of said main generator and said regulating armature for driving said armature, selectively adjustable rheostat means connected to said busses for providing a reversible control voltage of a magnitude and polarity depending upon the adjustment of the rheostat means, said main generator field means being connected to said rheostat means to be excited in accordance with said variable control voltage, and being connected to said armature of said regulating generator to be correctively excited in accordance with said regulating voltage, said pilot field means being connected with said drive motor to be excited substantially in proportion to the speed of said drive motor, said pattern field means having two circuits of which one is connected to said busses to provide normally constant component pattern excitation, while said other circuit is connected to said rheostat means to provide component pattern excitation dependent upon said reversible control voltage so that the resultant excitation of said pattern field means varies between minimum and maximum values of the same polarity as the excitation of said main generator field is caused by adjustment of said rheostat means to vary between a maximum of one polarity through zero to a maximum of the opposite polarity.

4. An adjustable-speed drive, comprising a direct-current drive motor, power supply busses for direct current, a direct-current main generator having an armature series connected with said drive motor across said busses and having main field means, a regulating generator having an armature for providing a regulating voltage and having mutually differential pilot field means and pattern field means for jointly controlling said regulating voltage, an auxiliary direct-current motor electrically connected to said busses and mechanically connected to said armatures of said main generator and said regulating generator to drive said armatures at substantially constant speed, a rheostat having a resistor connected across said busses and having a tap point and a slider movable over a range extending to both sides of said tap point for providing a control voltage selectively adjustable between positive and negative limit values respectively, said main field means being connected to said rheostat to receive reversible main excitation in accordance with said control voltages and being connected to said armature of said regulating generator to receive corrective excitation in accordance with said regulating voltage, said pilot field means being connected with said motor for providing said regulating generator with pilot field excitation dependent upon the motor speed, said pattern field means having two field circuits of which one is connected to said busses to receive normally constant pattern excitation while said other circuit is connected to said rheostat to receive reversible pattern excitation in accordance with said main excitation so as to provide resultant pattern excitation which varies between given values of the same polarity as said main excitation is varied between respective values of opposing polarities.

5. An adjustable-speed drive, comprising a direct-current drive motor, power supply busses for direct current, a direct-current main generator having an armature series connected with said drive motor across said busses and having a main field winding, a regulating generator having an armature for providing a regulating voltage and having mutually differential pilot field means and pattern field means for jointly controlling said regulating voltage, said pilot field means being connected with said motor for providing said regulating generator with pilot field excitation dependent upon the motor speed, said pattern field means having a pattern field winding connected between said busses so as to receive component pattern excitation of normally constant value and having another pattern field winding for providing a component pattern excitation of adjustable value, an adjustable potentiometric rheostat connected across said busses so as to provide a control voltage adjustable between respective values of opposing polarity, a bridge network having four bridge branches of substantially constant resistance which include said main field winding and said other pattern field winding and having two bridge diagonal circuits, said rheostat being connected in one of said diagonal circuits to excite said main field winding and said other pattern field winding in accordance with said control voltage, and said armature of said regulating generator being connected in said other diagonal circuit to superimpose on said main field winding and said other pattern field winding an excitation according to said regulating voltage, said two pattern field windings being rated to jointly provide resultant pattern field excitation which varies between values of the same polarity as the excitation of said main field winding varies between respective values of opposing polarities.

6. An adjustable-speed drive, comprising a direct-current drive motor, power supply busses for direct current, a direct-current main generator having an armature series connected with said drive motor across said busses and having a main field winding, a regulating generator having an armature for providing a regulating voltage and having mutually differential pilot field means and pattern field means for jointly controlling said regulating voltage, said pilot field means having two circuits of which one is connected across said drive motor to be excited in proportion to the counter E. M. F. of said motor while said other pilot field circuit is connected to said motor so as to be excited in proportion to the IR drop in the motor circuit for causing the resultant excitation of said pilot field means to correspond to the speed of said drive motor, said pattern field means having three windings of which one is connected to said busses so as to receive contact component pattern excitation, a bridge network having four serially interconnected branches of which two opposite ones include each one of said main field windings and one of said two other pattern field windings, said network having two diagonal circuits, said rheostat being connected in one of said diagonal circuits for cumulatively exciting said main field windings and cumulatively exciting said other two pattern field windings in accordance with said control voltage, and said armature of said regulating generator being connected in said other diagonal circuit to superimpose on said main field windings and on said other pattern field windings an excitation according to said regulating voltage.

7. An adjustable-speed drive, comprising a direct-current drive motor, power supply busses for direct current, a direct-current main generator having an armature series connected with said drive motor across said busses and having main field means, a regulating generator having an armature for providing a regulating voltage and having mutually differential point field means and pattern field means for controlling said regulating voltage, adjustable speed control means having circuit means connected to said main field means for providing it with excitation selectively adjustable between two limit values of different polarities to make said generator buck the voltage of said busses relative to said motor for low motor speeds and boost said bus voltage for high motor speeds, circuit means connected to said pattern field means and connected with said speed control means so as to provide said pattern field means with excitation varying between a minimum and a maximum of the same polarity as said excitation of said main field means is caused to vary between bucking and boosting action, and said pilot field means being connected with said motor for providing said regulating generator with pilot field excitation dependent upon the motor speed.

WALTER R. HARRIS.

REFERENCES CITED

The following references are of record in the file of this patent:

UNITED STATES PATENTS

| Number | Name | Date |
|---|---|---|
| 864,842 | Happer | Sept. 3, 1907 |
| 2,284,802 | Cook | June 2, 1942 |